(12) United States Patent
Browne et al.

(10) Patent No.: US 12,314,627 B1
(45) Date of Patent: May 27, 2025

(54) COLLABORATIVE WORKSPACE USING HEAD-MOUNTED DISPLAYS

(71) Applicant: Vision Products, LLC, Los Gatos, CA (US)

(72) Inventors: Michael P. Browne, San Mateo, CA (US); Kevin Lee Mellott, San Jose, CA (US)

(73) Assignee: Vision Products, LLC, Campbell, CA (US)

( * ) Notice: Subject to any disclaimer, the term of this patent is extended or adjusted under 35 U.S.C. 154(b) by 0 days.

(21) Appl. No.: 18/523,783

(22) Filed: Nov. 29, 2023

(51) Int. Cl.
*G06F 3/147* (2006.01)
*G06F 3/14* (2006.01)

(52) U.S. Cl.
CPC ............ *G06F 3/147* (2013.01); *G06F 3/1454* (2013.01)

(58) Field of Classification Search
CPC .............................. G06F 3/1454; G06F 21/604
See application file for complete search history.

(56) References Cited

U.S. PATENT DOCUMENTS

| | | | |
|---|---|---|---|
| 9,329,689 B2 | 5/2016 | Osterhout et al. | |
| 10,511,895 B2 | 12/2019 | DeFaria et al. | |
| 10,817,066 B2 * | 10/2020 | Ross | H04L 67/131 |
| 11,846,981 B2 * | 12/2023 | Dolev | G06F 9/451 |
| 2006/0115130 A1 | 6/2006 | Kozlay | |
| 2019/0354699 A1 * | 11/2019 | Pekelny | G06F 21/35 |

OTHER PUBLICATIONS

Browne, M., et al. "A head-mounted display system for UGV control stations," AUVSI 96, Orlando, FL, USA, Jul. 15-19, 1996, pp. 705-715.
Browne, M. "Head-mounted workstation displays for airborne reconnaissance applications," Proc. SPIE, Cockpit Displays V: Displays for Defense Applications, vol. 3363, Sep. 14, 1998, pp. 348-354.
Browne, M., et al. "Mitigating Visual Anomalies for Binocular HMDs Integrated with Faceted Simulators," Proc. of Interservice/Industry Training, Simulation, and Education Conference, Dec. 2011, pp. 1-12.

* cited by examiner

*Primary Examiner* — Kevin M Nguyen
(74) *Attorney, Agent, or Firm* — Fenwick & West LLP

(57) ABSTRACT

Embodiments relate to collaborative workspaces using head-mounted displays (HMDs). Collaborative workspaces enable multiple users to collaborate together in a common environment while also viewing content specific to each user using HMDs.

21 Claims, 10 Drawing Sheets

COLLABORATIVE WORKSPACE USING HEAD-MOUNTED DISPLAYS

BACKGROUND

1. Technical Field

This disclosure relates generally to collaborative workspaces using head-mounted displays (HMDs), and, more specifically, to providing private virtual objects to users via HMDs while the users view a common display.

2. Description of Related Art

In various organizational settings, providing access to information based on roles, responsibilities, and clearance levels is essential for maintaining security and efficiency. Traditional methods of managing access to information can be cumbersome and may require dedicated systems or multiple different environments (e.g., separate rooms) based on the clearance level, leading to a complex and disjointed user experiences. Furthermore, traditional methods may lead to informational clutter or confusion when multiple people with different jobs or responsibilities are viewing information relevant to all of the different jobs/responsibilities.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Configuration Overview

Figure 1:
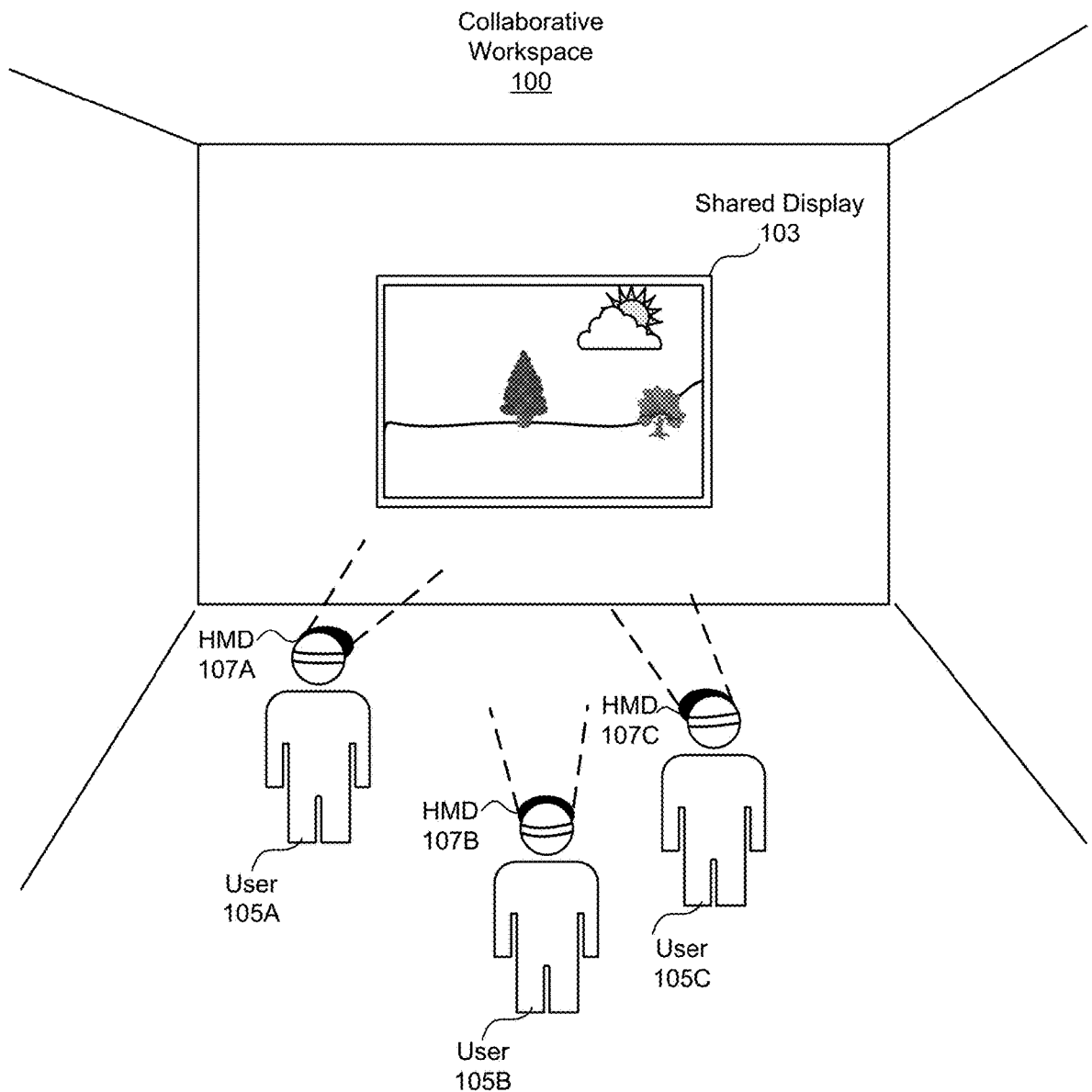
FIG. 1 is a diagram of an example collaborative workspace.

Embodiments herein relate to collaborative workspaces using head-mounted displays (HMDs). Collaborative workspaces enable multiple users to collaborate together in a common environment while also viewing content specific to each user by using HMDs. FIG. 1 is a diagram of an example collaborative workspace 100. The workspace includes three users 105A-C (each wearing an HMD 107A-C), and a shared display 103 (also referred to as a "common" display). Each user can view "public" images displayed by the shared display 103, while also viewing "private" user-specific virtual objects overlaid on the public images (via the HMDs 107A-C).

The virtual objects displayed to each user may depend on a content access tier assigned to each user. Generally, a content access tier specifies which private content (e.g., virtual objects) is viewable to users assigned to that tier. For example, the content access tiers are security clearance levels. Users with the same content access tier may view the same virtual objects but users with different content access tiers may view different virtual objects when looking at the same public content. For a given set of public content, there may be a set of content access tiers specifying different private content associated with that set of public content. In some embodiments, content access tiers are associated with certain jobs or responsibilities and users are assigned to a corresponding tier in accordance with their jobs/responsibilities. Content access tiers may be hierarchical such that higher tiers enable access to all private content in the lower tiers, however this is not required. In some embodiments, the content access tiers are not hierarchical (e.g., as demonstrated in the city hall planning meeting example described below). Depending on the use case, a user may be assigned to a content access tier, or a user may select an appropriate content access tier for themself.

The following paragraphs provide example uses cases of collaborative workspaces, which help demonstrate their advantages over conventional workspaces.

In a first example, a collaborative workspace includes a classroom with students wearing HMDs. A common display mounted on a wall displays a math problem that all of the students can see and for each of the students to solve. To accommodate the students' varied abilities, the HMDs may display different hints to different students when the students view the problem through their HMD. For example, if a first student has strong mathematical abilities, their HMD may display no or minor hints to solve the problem. If a second student is less capable in mathematics, their HMD may display additional hints for solving the problem (thus the content access tier of each student may correspond to their mathematical abilities). In some embodiments, any of the HMDs may display additional hints after threshold periods of time (e.g., to help any students who may be struggling to solve the problem). Thus, in contrast to conventional classroom environments where only the more capable students can engage in solving problems, this collaborative workspace enables all students to engage in solving the problem despite their varied abilities.

In a second example, a collaborative workspace environment may be implemented in a (e.g., government) command center. In conventional command center environments, (a) each person in the command center must have a threshold security clearance level to be in the room and/or (b) any common displays are limited to displaying images in accordance with the person with the lowest security clearance in the command center. In case (a), the command center prohibits people without the threshold security clearance level from contributing to work conducted in the command center. Furthermore, case (b) may hinder people conducting meaningful work in the command center because the limited images do not include content requiring higher level security clearance levels.

However, a collaborative workspace enables users with varying security clearance levels to be in the same the command center and to work together despite their varying security clearance levels. This is enabled by a common display (e.g., mounted to a wall) displaying images that all people in the command center can view (e.g., based on the person with the lowest security clearance in the command center). Furthermore, one or more people in the command center are wearing HMDs. The HMDs display virtual objects over the images from the common display. These virtual objects provide additional information to users according to their security clearance level (an example of a content access tier). For example, if the displayed image is a map, an HMD worn by a first person with a low security clearance level may only display a few additional features on the map (e.g., predicted weather pattern) to the first person, while an HMD worn by a second person with a high security clearance level may display any number of additional features that the second person has clearance to view (e.g., the location of a secret base on the map). In the above example, the HMDs may validate their users (e.g., using an iris scanner) prior to displaying virtual objects associated with a content access tier to prevent a user from viewing content outside of their security clearance level. Additionally, or alternatively, the HMDs may recognize when a user has removed the HMD from their head. In response to this, an HMD may cease displaying virtual objects. If the user or another user places the HMD on their head, the HMD may validate the wearer and then begin displaying private content in accordance with their content access tier.

In a third example, a collaborative workspace includes a city hall planning meeting, where people of different departments can view different virtual objects through their HMDs. For example, if a shared display is displaying a map of a city for an upcoming event, the head of police may additionally view the locations of police check points and crowd control checkpoints when they look at the map through their HMD, while the head of the fire department may view the locations of fire crew standby stations when they look at the map through their HMD, while the head of sanitation may view the locations of sanitation stations and portable toilets when they look at the map through their HMD (in this example, the content access tier of each person corresponds to the department they work for). Conventionally, each of those departments may need to look at different maps (each with their corresponding objects) or at a single map with objects for each department, which may cause confusion due to the many objects on that map.

Example Views in Collaborative Workspaces

Figure 2A:
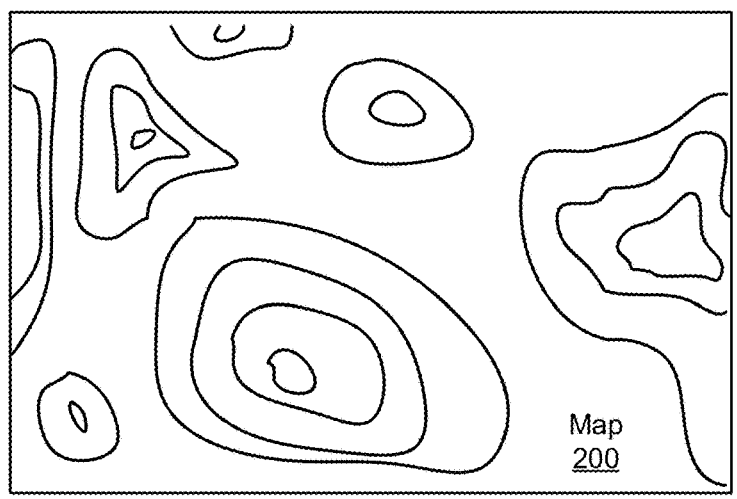
FIG. 2A is an example contour map displayed by a common display in a collaborative workspace.
Figure 2B:
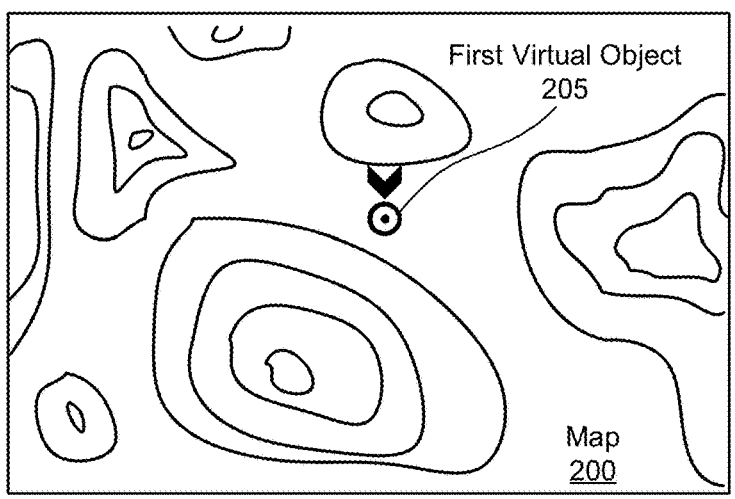
FIG. 2B is an example of a first user's view of the contour map.
Figure 2C:
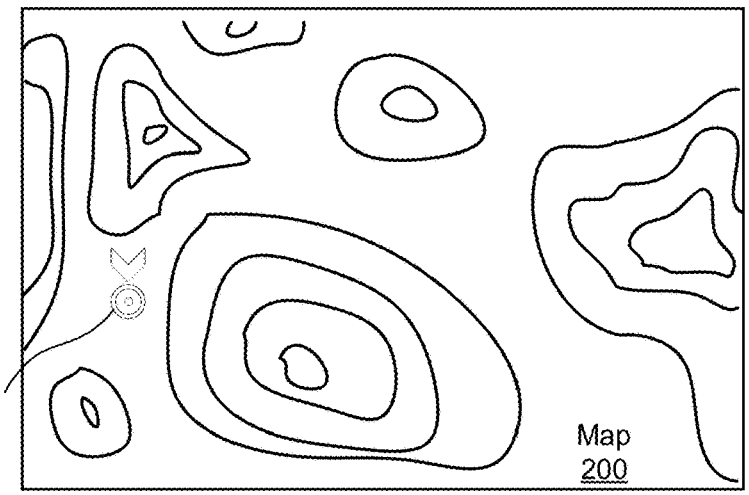
FIG. 2C is an example of a second user's view of the contour map.

FIGS. 2A-2D display an example map 200 and various example virtual objects 205, 210 overlaid on the map 200 in an example collaborative workspace (e.g., 100). FIG. 2A is a contour map 200 displayed by a common display (e.g., 103) so that everyone (e.g., users 105A-C) in the collaborative workspace can view the map 200. FIG. 2B is an example of a first user's view of the map 200, where the first user is wearing an HMD (e.g., 107A) and is associated with a first content access tier. The first user's view includes the map 200 and a first virtual object 205 overlaid on the map 200 (displayed by the HMD). For example, the first virtual object 205 represents the location on the map 200 of a first objective for the first user. Similarly, FIG. 2C is an example of a second user's view of the map 200, where the second person is wearing an HMD and is associated with a second content access tier. The second user's view includes the map 200 and a second virtual object 210 overlaid on the map 200 (displayed by the HMD). For example, the second virtual object 210 represents the location on the map 200 of an objective for the second user.

Figure 2D:
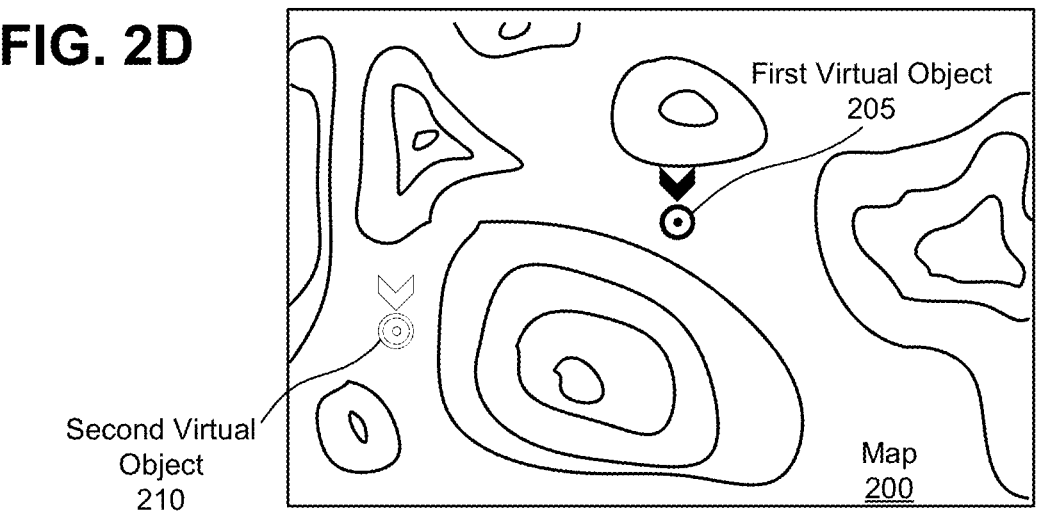
FIG. 2D is an example of a third user's view of the contour map.

FIG. 2D is an example of a third user's view of the map 200, where the third person is wearing an HMD and is associated with a third content access tier. Their view includes the map 200 and both the first and second virtual objects overlaid on the map 200 (displayed by the HMD). The first and second virtual objects may represent the location of objectives for the third user (e.g., the third person is a project lead managing the first user and the second user). Since all three people are associated with different content access tiers, in this example, each person has a different view when they view the map 200. More specifically, the first user does not see the second virtual object 210 when they view the map 200, the second user does not see the first virtual object 205 when they view the map 200, and the third person views both virtual objects when they view the map 200. Depending on the content access tiers, other combinations are also possible. For example, a first user views first and second virtual objects when looking at a shared display, a second user views the second virtual object and a third virtual object when looking at the shared display, and a third user views the first and third virtual objects (or possibly just the third virtual object), when looking at the shared display.

Figure 3:
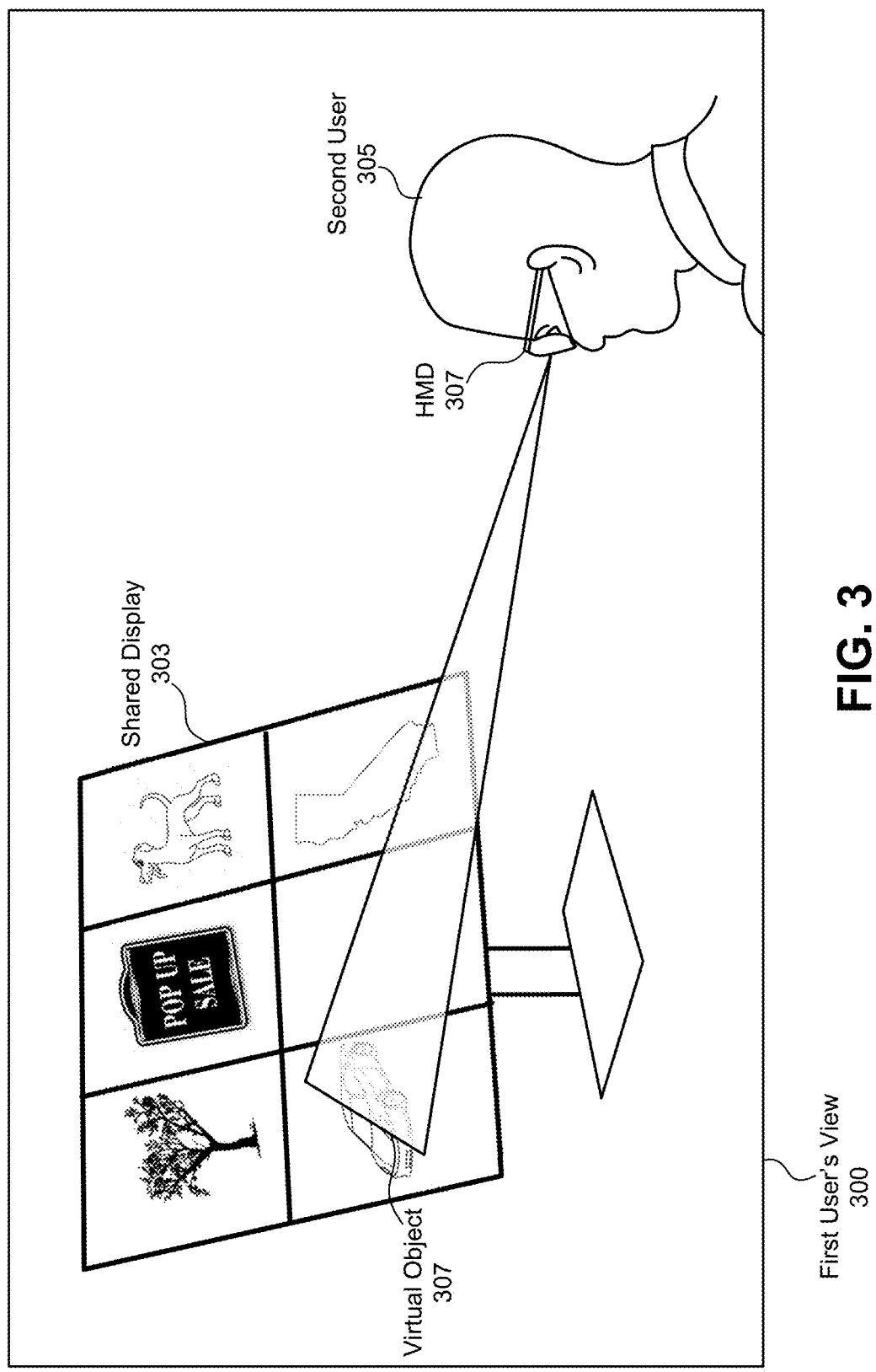
FIG. 3 is an example of a first user's view in another collaborative workspace.

FIG. 3 is an example diagram of a first user's view 300 in another collaborative workspace. The user's view 300 includes a shared display 303 and a second user 305 with an HMD 307 viewing the shared display 303. In this example, the content access tier of the first user enables the first user to see where the second user 305 is looking on the shared display 303. Specifically, the HMD of the first user displays a virtual object 307, which indicates the field of view of the second user 305. In this example, the second user 305 is voluntarily participating in a visual reaction test (e.g., "find the car in the following images"). Display of the virtual object 307 enables the first user to observe how the second user 305 performs during the test. In another example, the virtual object 307 may be replaced with a virtual object that indicates the line of sight of the second user 305, such as a dot overlaid on the shared display 303. Note that the second user 305 may also have a content access tier and may be viewing virtual objects via the virtual object 307 (which may or may not be displayed to the first user).

In some embodiments, a user viewing a virtual object may allow another user to view that object. For example, in the context of FIG. 3, the first user may place a virtual marker on the shared display 303 and then grant the second user 305 access to view that marker. This may, for example, allow the first user to point to different content objects on the shared display 303 so the second user 305 can see what the first user is referring to. These features may be enabled by the first user's HMD communicating with the second users HMD 307 (e.g., via a server).

In some embodiments, if a content access tier allows access to a set of multiple private content items (e.g., multiple virtual objects), the user may (e.g., dynamically or in real time) select a subset of content they wish to view. In response, the HMD may display the subset of private content items when the user views the shared display 303 instead of displaying the entire set of private content items authorized by that content access tier. Among other advantages, this may reduce clutter or confusion and enable the user to focus on specific aspects in a collaborative work environment.

The above examples describe collaborative workspaces where all of the users are physically located in the same location and viewing the same shared display (e.g., 103), however this is not required. If physically separated displays (e.g., in different buildings) are displaying the same public content, then users may be able to view virtual objects for that public content regardless of which display they view, thus enabling users in different locations (and with different content access tiers) to collaborate together.

Example Systems

Figure 4:
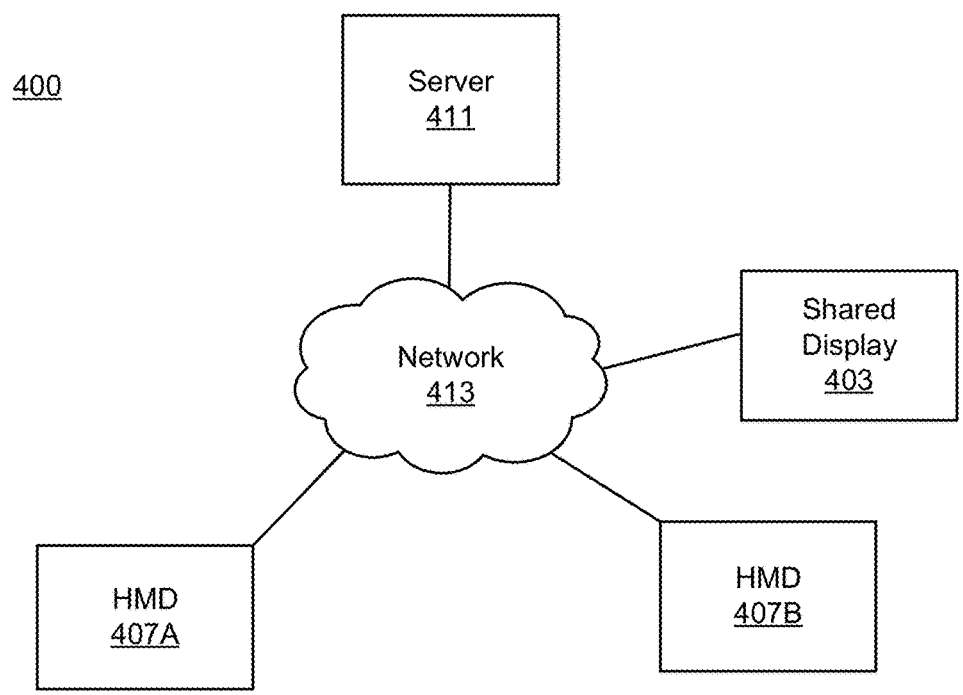
FIG. 4 is an example block diagram of a networked computing environment suitable for enabling a collaborative workspace.

FIG. 4 is an example block diagram of a networked computing environment 400 suitable for enabling a collaborative workspace. In the embodiment shown, the networked computing environment 100 includes a server 411, a shared display 403, a first HMD 407A (worn by a first user), and a second HMD 407B (worn by a second user), all connected via a network 413. Reference number 407 may collectively refer to the HMDS 407A-B. Although two HMDs 407 are shown, the networked computing environment 400 can include any number of HMDs. In other embodiments, the networked computing environment 400 includes different or additional components. In addition, the functions may be distributed among the components in a different manner than described.

The server 411 is a computer system configured to host, manage, and facilitate collaborative workspaces. For example, the server 411 facilitates data between the shared display 403 and the HMDs 407 to enable a collaborative workspace. More specifically, the server 411 may provide content to the shared display 403 for display. The server 411 may also instruct the HMD 407A to display a first virtual object to the first user, where the first object is overlaid on the public content. Display of the first virtual object may be authorized by a content access tier of the first user. Additionally, the server 411 may instruct the second HMD 407B to display a second virtual object different than the first virtual object) to the second user, where the second virtual object is overlaid on the public content. Display of the second virtual object may be authorized by a content access tier of the second user. The server 411 is further described with respect to FIG. 5.

An HMD (e.g., 407A) is a wearable computer system configured to present content (e.g., images) to a user. An HMD may enable a user to view virtual objects overlaid onto images (e.g., video) displayed by the shared display 403. An HMD typically includes a screen, optics, and supporting structures mounted on a user's head or integrated into a helmet. Thus, HMDs may enable an immersive visual experience by projecting images directly in front of the user's eyes, often simulating a virtual environment or enhancing the real world with augmented reality. An HMD may be a virtual reality (VR) headset, an augmented reality (AR) headset, a mixed reality (MR), or some combination thereof.

An HMD may include a module that identifies an image displayed by the shared display 403 and displays a virtual object (e.g., from the server 411) such that the virtual object appears to be on or near the image from the user's perspective. In some embodiments, an HMD is configured to identify the display itself before presenting virtual objects. The virtual object may be displayed in accordance with a content access tier of the user.

An HMD may include one or more components that prevent or reduce light emitted by the HMD from leaking into the external environment (e.g., to prevent light reflected from the user or from an optical component of the HMD into the external environment). This may reduce or prevent leakage of private content (being displayed to the user wearing the HMD) from being seen by people who are not assigned to the proper content access tier (e.g., people standing near the user in the external environment). Example components include shutters, baffles, and non-transparent panels placed around the HMD. Additional details on example light secure HMDs can be found in U.S. Pat. No. 10,451,878, which is incorporated by reference herein in its entirety.

An example HMD is a smartphone held in front of a user's eyes (e.g., by the user's hand or a supporting structure) that captures images of the environment and displays images of the environment to the user (e.g., augmented with virtual objects) via a screen. Other example HMDs 407 are described with respect to FIGS. 7-9.

In some embodiments, an HMD may be replaced with a display, such as a tablet, laptop, or smartphone. For example, if one user is in a remote location (e.g., working from home), they may be able to view the public content and any virtual objects (associated with their content access tier) on the screen of their display (depending on the display, the "virtual objects" may be converted to non-virtual content). In these embodiments, the display may interact with the server 411 similar to an HMD.

The shared display 403 is a system configured to display content (e.g., images) to users. For example, the shared display 403 is a computing system designed for the reception, decoding, and display of audiovisual signals, providing presentation of information content. The shared display 403 includes a screen for displaying the content, such as a liquid-crystal-display (LCD), organic light-emitting diode (OLED) display, or cathode-ray-tube (CRT) display. In the example of FIG. 4, the shared display 403 is a computing system capable of receiving input as well as transmitting or receiving data via the network 413 (e.g., from the server 411 or HMDs 407), however this is not required. Example shared displays 403 include desktop computers, laptop computers, smartphone, tablets, smart televisions, and projectors with and projector screens.

Although descriptions herein generally refer to a single shared display 403 embodiments may include multiple shared displays where virtual objects may be overlaid over the multiple displays (e.g., a used sees a first virtual object overlaid over content of a first shared display and a second virtual object overlaid over content of a second shared display). Similarly, if shared displays are physically separated from each other (e.g., in different buildings) but displaying the same public content, then users may be able to view virtual objects (according to their respective content access tiers) regardless of which display they view, thus enabling users in different locations (and with different content access tiers) to collaborate together.

The network 413 provides the communication channels via which the other elements of the networked computing environment 100 communicate. The network 413 can include any combination of local area and/or wide area networks, using both wired and/or wireless communication systems. In one embodiment, the network 413 uses standard communications technologies and/or protocols. For example, the network 413 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 413 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 413 may be represented using any suitable format, such as hypertext markup language (HTML) or extensible markup language (XML). In some embodiments, all or some of the communication links of the network 413 may be encrypted using any suitable technique or techniques.

Figure 5:
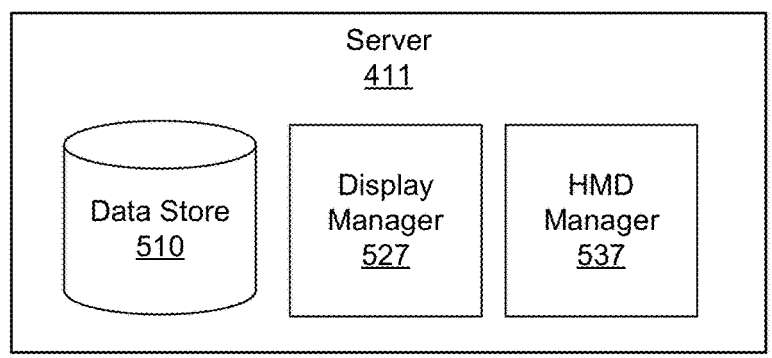
FIG. 5 is a block diagram of the server, according to one or more embodiments.

FIG. 5 is a block diagram of the server 411, according to one or more embodiments. The server includes a data store module 510, a display manager module 527, and an HMD manager module 537. In other embodiments, the server 411 includes different or additional modules. In addition, the functions may be distributed among the modules in a different manner than described. For example, some or all functionalities of the server 411 may be performed by the shared display 403 or the HMDs 407. For example, the virtual objects may be stored on individual HMDs 407 (e.g., assuming those HMDs have native storage devices). When an HMD identifies a user using the HMD and a content access tier associated with that user, the HMD may retrieve the appropriate virtual objects from its local storage and display them when the user looks at the shared display 403. Similarly, the shared display 403 may store images (e.g., videos) to be displayed and may display them when instructed (e.g., by a user).

The data store 510 includes one or more computer-readable media that store data managed by the server 411. The data in the data store 510 may include images to be displayed by the shared display 403, virtual objects to be displayed by the HMDs 407, content access tiers associated with individual users, or some combination thereof. Although the data store 510 is shown as a single element within the server 411 for convenience, the data store 510 may be distributed across multiple computing system (e.g., as a distributed database).

The display manager 527 communicates with the shared display 403. For example, the display manager 527 transmits images (e.g., stored in the data store 510) to the shared display 403 to be displayed by the shared display 403. In some embodiments, the display manager 527 controls the shared display 403.

The HMD manager 537 communicates with the HMDs 407. The HMD manager 537 may send virtual objects (e.g., stored in the data store 510) to each HMD. For example, an HMD transmits a user identification indicating the user using the HMD. The HMD manager 537 may then identify the content access tier of that user, identify one or more virtual objects (or other content) allowed by that content access tier, and then transmit those virtual objects to the HMD. Additionally, the virtual objects may correspond to the content sent to the shared display 403. In other words, the virtual objects may be designed to be displayed with the content of the shared display 403.

Example Methods

Figure 6:
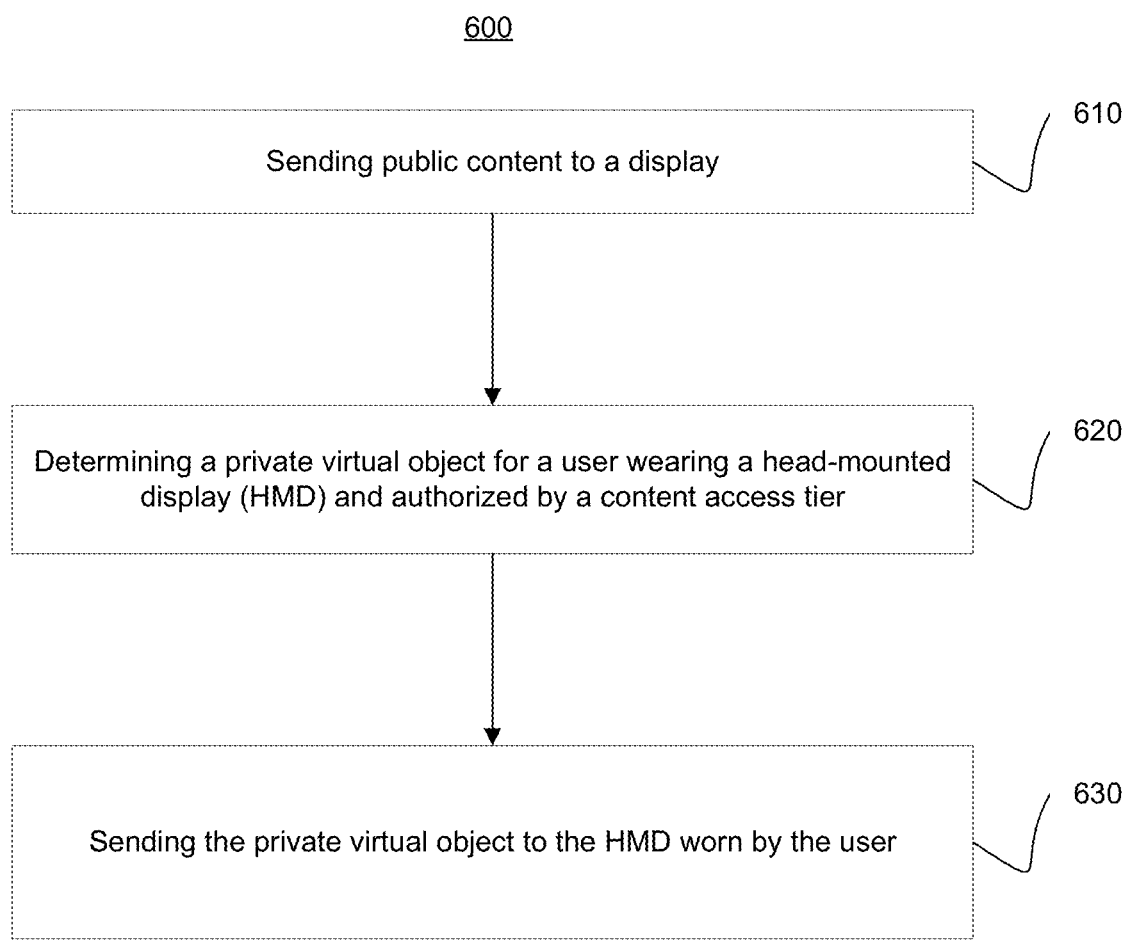
FIG. 6 illustrates a method for implementing a collaborative workspace, according to one or more embodiments.

FIG. 6 illustrates a method 600 for implementing a collaborative workspace, according to one or more embodiments. In the example of FIG. 6, the method 600 is performed by server 411 (and from the perspective of the server 411), however one or more steps of method 600 may instead be performed by other components, such as an HMD (e.g., 407A) or the shared display 403. Instructions for the method 600 may be stored as program code that is executable by a computing system (e.g., server 411). For example, the method 600 may be performed using the functionality and data of the modules of server 411 shown in FIG. 5. The steps may be performed in different orders, and the method 600 can include greater or fewer steps than described herein.

At step 610, the server 411 sends public content (e.g., an image) to a display (e.g., to the shared display 403 via the network 413). When the public content is displayed by the display, the public content is viewable by users situated in a viewing region of the display. The viewing region refers to a region of space where a user in that space can view content displayed by the display. For example, if the display is mounted on a wall in a room, then the viewing region of the display includes any location in the room where a user can view content displayed by the display. As used herein "public" content refers to content available to any user of the collaborative workspace (e.g., even if they aren't wearing an HMD). For example, public content is viewable by users regardless of the content access tiers assigned to those users. Although the descriptions herein primarily refer to public content being displayed by the display, public content may be displayed by other components, such as an HMD.

At step 620, the server 411 determines a private virtual object (e.g., a virtual image) to for a user wearing an HMD (e.g., 407A). The determined private virtual object is intended to be displayed to the user by the HMD (not by the display). The private virtual object is authorized by (e.g., according to) a content access tier (e.g., previously assigned to the user. In contrast to public content as described above, private content (such as a virtual object) is not intended to be available to any user, but instead is intended to be displayed according to selective criteria. For example, private content is made available for viewing subject to a user having the proper content access tier (e.g., security access). Thus, in the context of collaborative workspaces, it may be advantageous for private content to be displayed by HMDs to keep the content private and prevent other users from inadvertently viewing the content. Although the descriptions herein primarily refer to private virtual objects, other types of content (e.g., non-virtual objects) may also be private.

The server 411 may determine the private virtual object by identifying one or more virtual objects associated with the public content and the content access tier of the user. The private object may be associated with the public content of step 610. For example, the private virtual object is intended to be overlaid on the public content sent to the display (e.g., the first virtual object 205 overlaid over map 200 as illustrated in FIG. 2A).

At step 630, the server 411 sends the private virtual object to the HMD worn by the user. The server 411 may send the private virtual object subsequent to (e.g., responsive to) determining the HMD (worn by the user) is within a threshold distance of the display or is in the viewable region (e.g., via GPS coordinates or by the user confirming they are in the viewable region).

The HMD displays the private virtual object overlaid on the public content displayed by the display (e.g., when the user is looking at the displayed public content). For example, the HMD identifies the public content, determines the private virtual object is associated with the public content, and, responsive to this, displays the virtual object over the public content. The HMD may identify the public content by analyzing an image of the public content captured by a camera (e.g., of the HMD). For example, the HMD compares the captured image with an image of the public content (e.g., provided by the server 411). In some embodiments, the public content includes a fiducial (e.g., an embedded marker or a markerless fiducial) that the HMD identifies. Additionally, or alternatively, the display itself may include a fiducial marker to help the HMD to locate and identify the display itself. In some embodiments, fiducials are interleaved in the public content displayed by the common display to enable or disable private content to be displayed by the HMDs. For example, the interleaved fiducials include interleaved key codes in public content coming at frame rate. These key codes may be identified by the HMD (by analyzing captured images of the public content) and may inform the HMDs what virtual objects to display (e.g., a code that identifies private content associated with the public content).

The HMD may display the private virtual object only on the public content. Thus, for example, if the user turns away from the display, the HMD may cease displaying the private virtual object. The HMD may determine a user is viewing the public content and/or in the viewable region via head tracking, eye tracking, and/or identifying the public content (e.g., identifying a fiducial marker of the public content) in an image captured by an external facing camera.

In some embodiments, determining the private virtual object for the user includes the server 411 determining an identity of the user and determining the content access tier assigned to the user (e.g., referencing content access tier assignments stored in the data store 510). The HMD may provide the identity of the user to the server 411. For example, the HMD authenticates the user when the user puts on the HMD. For example, the user may enter a unique username or password, or the HMD performs an iris scan of the user's eye (e.g., using an infrared source and infrared camera).

In some embodiments, the method 600 further includes the server 411 determining a second private virtual object for a second user wearing a second HMD (different than the first HMD). The second private virtual object may be different than the private virtual object (e.g., if the second content access tier is different than the content access tier described with respect to step 620). Similar to the description with respect to step 620: (a) the determined second private virtual object is intended to be displayed to the second user by the second HMD; (b) the second private virtual object is authorized by (e.g., according to) a second content access tier (e.g., previously) assigned to the second user (the second content access tier may be different than the content access tier described with respect to step 620); (c) the server 411 may determine the second private virtual object by identifying one or more virtual objects associated with the public content and the second content access tier of the second user; (d) the second private object may be associated with the public content of step 610; or some combination thereof.

The method 600 may further include the server 411 sending the second private virtual object to the second HMD worn by the second user. Similar to the description with respect to step 630: the server 411 may send the second private virtual object subsequent to (e.g., responsive to) determining the second HMD (worn by the second user) is within a threshold distance of the display or is in the viewable region; (b) the second HMD displays the second private virtual object overlaid on the public content displayed by the display (e.g., when the second user is looking at the displayed public content); (c) or some combination thereof.

Since the virtual objects are displayed by HMDs (e.g., concurrently), the collaborative workspace may result in the first user not seeing the second virtual object and the second user not seeing the first virtual object (e.g., if the users have different content access tiers). Said differently, the private virtual object is not displayed by the second HMD, and the second private virtual object is not displayed by the HMD. In some embodiments, the private virtual object is not displayed by the second HMD, and the private virtual object and the second private virtual object are displayed by the HMD (e.g., see description with respect to FIG. 2D). In some embodiments, the private virtual object indicates a portion of the public content that the second user is viewing (via the second HMD) (e.g., see description with respect to FIG. 3).

In some embodiments, the private virtual object and the second private virtual object are overlaid on the same location on the public content. Said differently, the private virtual object may appear to be at a location of the public content (from the perspective of the first user) and the second private virtual object may also appear to be at the location of the public content (from the perspective of the second user). Even in these embodiments, the virtual objects may be the same or different.

Other aspects include components, devices, systems, improvements, methods, processes, applications, computer readable mediums, and other technologies related to any of the above.

Example Head-Mounted Displays (HMDs)

Figure 7:
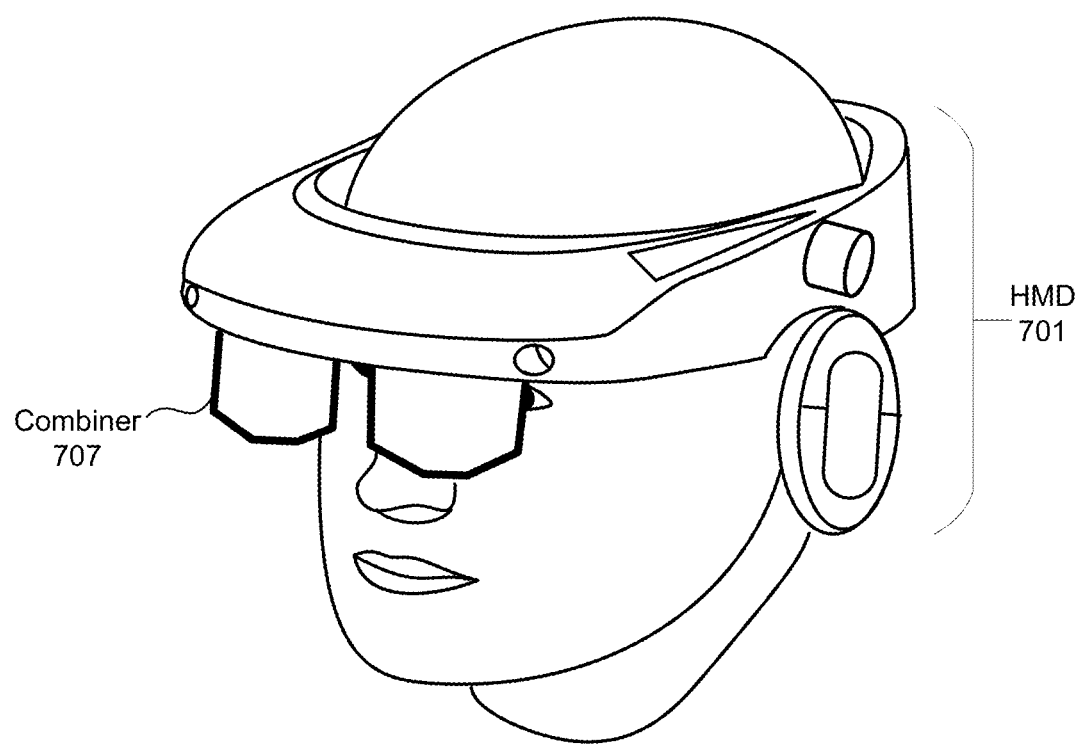
FIGS. 7-9 are diagrams of example HMDs.
Figure 8:
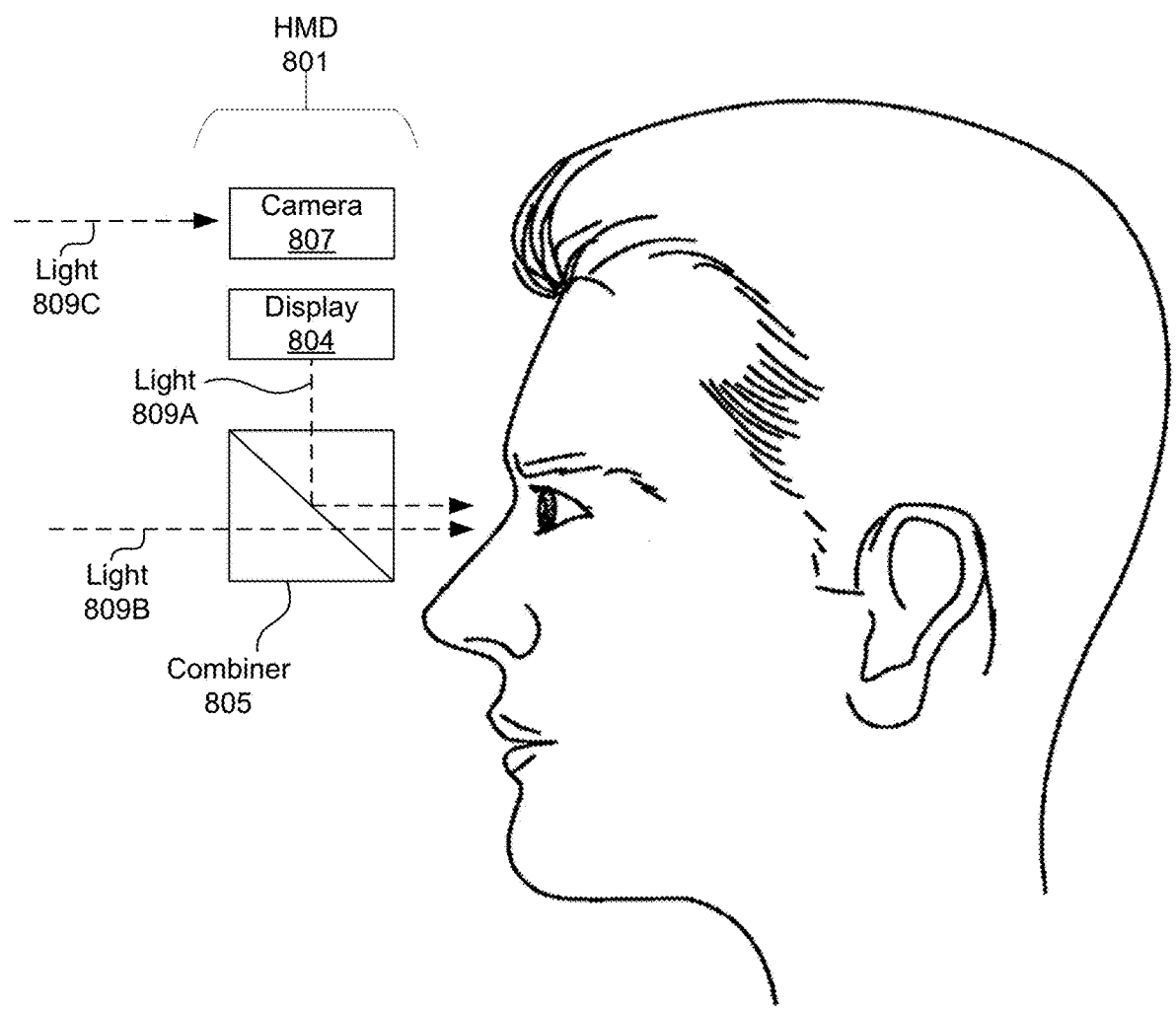
Figure 9:
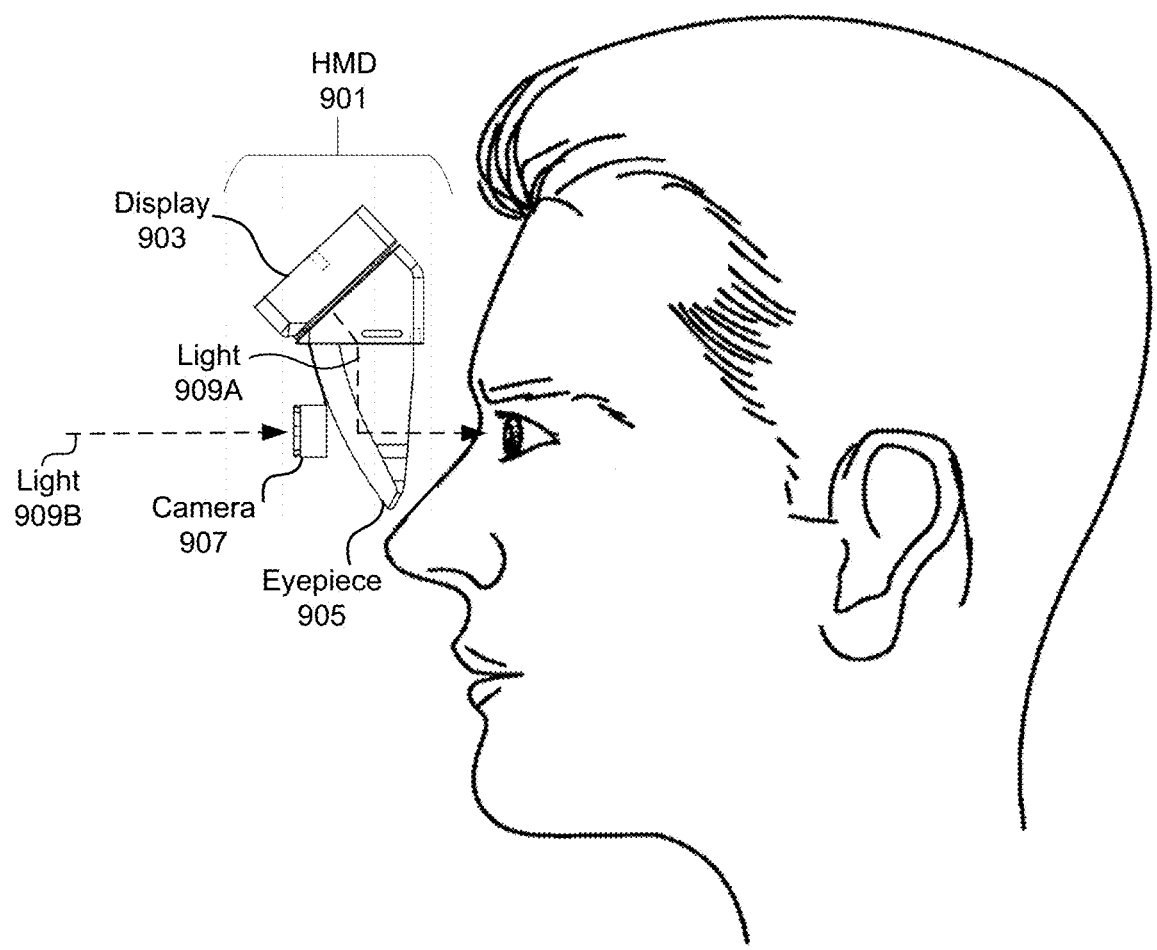

FIGS. 7-9 are diagrams of examples HMDs (e.g., 407). FIGS. 7-8 are diagrams of example optical see-through HMDs. See-through HMDs overlay electronic information onto a view of the user's external environment. These HMDs include a beam combiner that optically combines light from the external environment with light from a display. For example, FIG. 7 is a diagram of a user wearing a see-through HMD 701 (with a combiner 707).

FIG. 8 is a block diagram of another optical see-through HMD 801 that includes a display 804, a beam combiner 805, and a camera 807, according to one or more embodiments. The display 804 is positioned above the user's eye, however other configurations are possible (e.g., the display 804 is below or to the side of the user's eye). The combiner 805 is positioned to direct light 809A from the display 804 and light 809B from an external environment to the user's eye. The components of the HMD 801 may be supported by a frame (not illustrated) that can be worn on or around the user's head. Furthermore, while the components are illustrated as blocks, the components can take on many different shapes and configurations. For example, the HMD 801 may be similar to a pair of glasses or goggles.

The display 804 can display images that are directed to the user. For example, the display 804 may be a liquid crystal display (LCD), an organic light emitting diode (OLED) display or a microLED device. The HMD 801 may have any number of displays. The images displayed by the display 804 may include information, such as text, images, graphics, and videos, which modify or augment the user's view of the external environment. The information may be specific to the user's view of the external environment, such as information that identifies people and objects, and it may assist the user to navigate or operate in the external environment. The images are generated by a processing system (not illustrated) and are transmitted to the display 804, for example, using wired or wireless technologies. The processing system may be integrated into the HMD or located outside of the HMD.

The camera 807 is pointed away from the user's eye to capture light 809C from the external environment in front of the user. Images captured by the camera 807 may be analyzed by the HMD 801 to identify public content from a shared display. The images may also be analyzed to determine where to display virtual objects so they appear to be in the external environment (e.g., overlaid on the public content from a shared display).

The combiner 805 combines images from the display 804 with light from the external environment by directing light 809B (via a first optical path) from the external environment to the user's eye and by directing light 809A (via a second optical path) from the display 804 to the user's eye. The combiner 805 may include partially metallized mirrors, dielectric coatings, dichroic coatings and/or interference coatings disposed on a transmissive material, partially transmissive mirror, waveguide device, or polarized beam combiner. Additionally, the combiner 805 may include one or more focusing and/or collimating lenses. In some embodiments, the combiner 805 has optical power that magnifies or shrinks images. The HMD may have a single combiner 805 that directs light to one or both eyes of the user, or the HMD may include one or more combiners 805 for each eye.

FIG. 9 is a block diagram of an electronic see-through HMD 901, according to one or more embodiments. Electronic see-through HMDs (also referred to as video see-through HMDs) occlude a user's field of view and use outward facing cameras to display images of the external environment to the user. The example HMD 901 includes a display 903, an eyepiece 905, and an outward facing camera 907. The camera 907 is pointed away from the user's eye to capture light 909B from the external environment in front of the user. In the example of FIG. 9, the camera 907 is behind the eyepiece 905 and the camera dimensions (e.g., width and height) are smaller than the eyepiece 905. The camera 907 may be aligned to have a same line of sight as the eye. Said differently, the camera 907 may be aligned with the user's line of sight when the user is looking at the center of the eyepiece 905. However, this alignment is not required. It is desirable for the camera to have a resolution and a bit depth that provides a reasonably good image of the external environment.

The display 903 displays images (labeled light 909A in FIG. 9) that are projected by the eyepiece 905 to the eye in real-time or near real-time. The projected light 909A may include images captured by the camera 907 to enable the user to function in the external environment. The display 903 may be a liquid crystal display (LCD), an organic light emitting diode (OLED) display or a microLED device.

The eyepiece 905 is an optical component that projects light 909A from the display 903 to the eye. For example, the eyepiece 905 may be a compact, freeform, frameless prism eyepiece. Other examples of eyepieces 905 include compact waveguide eyepieces, conventional spherical or aspheric eyepieces, polarization-based "pancake optics" or other freeform optical systems. The eyepiece 905 may completely or partially prevent light from the external environment (e.g., 909B) from entering the eye. For example, outward facing surfaces of the eyepiece 905 may be opaque.

Computing System Architecture

Figure 10:
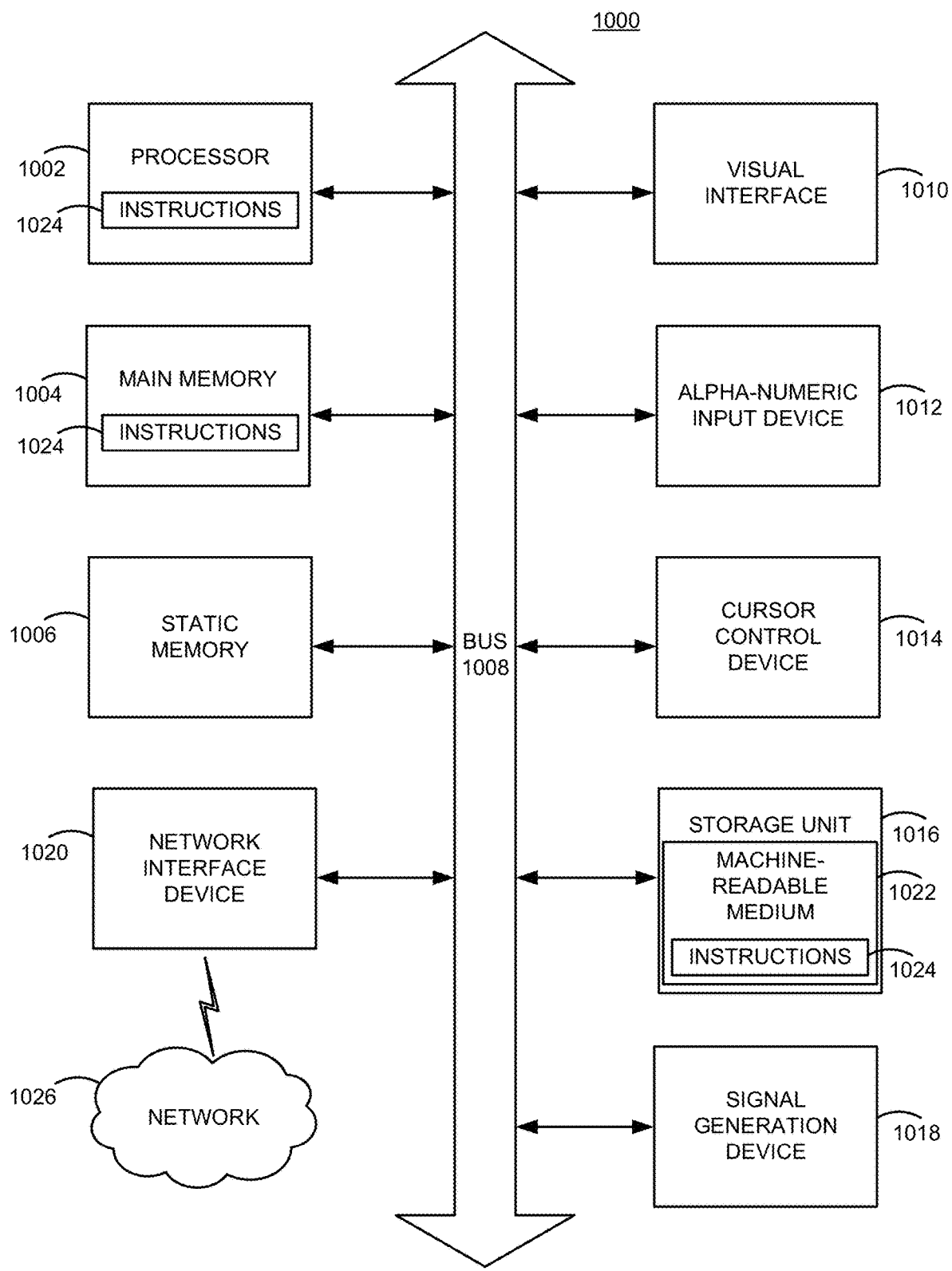
FIG. 10 is a block diagram illustrating an embodiment of components of an example machine able to read instructions from a machine-readable medium and execute them in a set of one or more processors (or controller).

FIG. 10 is a block diagram illustrating an embodiment of components of an example machine able to read instructions from a machine-readable medium and execute them in a set of one or more processors (or controller). Specifically, FIG. 10 shows a diagrammatic representation of a machine in the example form of a computer system 1000 (also "computing system 1000") within which program code (e.g., software) for causing the machine to perform any one or more of the methodologies discussed herein may be executed. The computer system 1000 may be used for one or more components described herein, such as the server 411, the shared display 403, and the HMDs 407. The program code may be comprised of instructions 1024 executable by a set of one or more processors 1002 (e.g., which can execute the instructions individually or collectively) of the computer system 1000. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a computing system capable of executing instructions 1024 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 1000 includes a set of one or more processors 1002 (e.g., including one or more central processing units (CPUs), one or more graphics processing units (GPUs), one or more digital signal processors (DSPs), one or more application specific integrated circuits (ASICs), one or more radio-frequency integrated circuits (RFICs), one or more field programmable gate arrays (FPGAs), or some combination thereof), a main memory 1004, and a static memory 1006, which are configured to communicate with each other via a bus 1008. The computer system 1000 may further include visual display interface 1010. The visual interface may include a software driver that enables (or provide) user interfaces to render on a screen either directly or indirectly. The visual interface 1010 may interface with a touch enabled screen. The computer system 1000 may also include input devices 1012 (e.g., a keyboard a mouse), a storage unit 1016, a signal generation device 1018 (e.g., a microphone and/or speaker), and a network interface device 1020, which also are configured to communicate via the bus 1008.

The storage unit 1016 includes a machine-readable medium 1022 (e.g., magnetic disk or solid-state memory) on which is stored instructions 1024 (e.g., software) embodying any one or more of the methodologies or functions described herein. The instructions 1024 (e.g., software) may also reside, completely or at least partially, within the main memory 1004 or within the set of one or more processors 1002 (e.g., within a set's cache memory) during execution.

Additional Considerations

Some portions of the above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a set of one or more processors or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for providing partial synchronization of database tables. Thus, while particular embodiments and applications have been illustrated and described, it is to be understood that the described subject matter is not limited to the precise construction and components disclosed. The scope of protection should be limited only by the following claims.

What is claimed is:

1. A system comprising:
   a first head-mounted display (HMD) worn by a first user, the first user associated with a first content access tier previously assigned to the first user;
   a second HMD worn by a second user, the second user associated with a second content access tier different than the first content access tier;
   a physical display configured to display public content viewable by both the first and second users; and
   a computer system configured to:
      instruct the first HMD to display a first private virtual object overlaid on the public content to the first user, wherein display of the first private virtual object is authorized by the first content access tier;
      instruct the second HMD to display a second private virtual object different than the first private virtual object overlaid on the public content to the second user, wherein display of the second private virtual object is authorized by the second content access tier; and
      instruct the first HMD to, subsequent to determining the first user is not viewing the public content, cease displaying the first private virtual object on the public content to the first user.

2. A method comprising:
   sending public content to a physical display, wherein the public content is viewable by users situated in a viewable region for the display;
   determining a private virtual object for a user wearing a head-mounted display (HMD) and authorized by a content access tier previously assigned to the user; and
   sending the private virtual object to the HMD worn by the user, the HMD displaying the private virtual object overlaid on the public content displayed by the display and, subsequent to a determination that the user is not viewing the public content, ceasing to display the private virtual object on the public content to the user.

3. The method of claim 2, further comprising:
   determining a second private virtual object for a second user wearing a second HMD and authorized by a second content access tier previously assigned to the second user; and sending the second private virtual object to the second HMD worn by the second user, the second HMD displaying the second private virtual object overlaid on the public content displayed by the display.

4. The method of claim 3, wherein the private virtual object is not displayed by the second HMD, and the second private virtual object is not displayed by the HMD.

5. The method of claim 3, wherein the private virtual object is not displayed by the second HMD, and the private virtual object and the second private virtual object are displayed by the HMD.

6. The method of claim 5, wherein the private virtual object indicates a portion of the public content that the second user is viewing.

7. The method of claim 3, wherein the private virtual object and the second private virtual object are displayed concurrently.

8. The method of claim 3, wherein the private virtual object and the second private virtual object are overlaid on the same location on the public content.

9. The method of claim 2, wherein the HMD displays the private virtual object only on the public content.

10. The method of claim 2, wherein the private virtual object is associated with the public content and the HMD displays the private virtual object overlaid on the public content responsive to identifying the public content.

11. The method of claim 10, wherein identifying the public content includes identifying a fiducial marker in the public content.

12. The method of claim 2, wherein determining the private virtual object for the user comprises determining an identity of the user and determining the content access tier assigned to the user.

13. The method of claim 2, wherein the content access tier is a security access level assigned to the user.

14. The method of claim 2, wherein the public content is viewable by users regardless of content access tiers assigned to the users.

15. The method of claim 2, wherein the public content is viewable by users not wearing HMDs.

16. The method of claim 2, wherein the private virtual object is sent to the HMD worn by the user responsive to:
   a determination that the HMD worn by the user is in the viewable region; or
   a determination that the HMD worn by the user is within a threshold distance away from the display.

17. A non-transitory computer-readable storage medium comprising stored instructions that, when executed by a computing system, cause the computing system to perform operations comprising:
   sending public content to a physical display, wherein the public content is viewable by users situated in a viewable region for the display;

determining a private virtual object for a user wearing a head-mounted display (HMD) and authorized by a content access tier previously assigned to the user; and sending the private virtual object to the HMD worn by the user, the HMD displaying the private virtual object overlaid on the public content displayed by the display and, subsequent to a determination that the user is not viewing the public content, ceasing to display the private virtual object on the public content to the user.

18. The non-transitory computer-readable storage medium of claim 17, further comprising:

determining a second private virtual object for a second user wearing a second HMD and authorized by a second content access tier previously assigned to the second user; and sending the second private virtual object to the second HMD worn by the second user, the second HMD displaying the second private virtual object overlaid on the public content displayed by the display.

19. The non-transitory computer-readable storage medium of claim 18, wherein the private virtual object is not displayed by the second HMD, and the second private virtual object is not displayed by the HMD.

20. The non-transitory computer-readable storage medium of claim 18, wherein the private virtual object is not displayed by the second HMD, and the private virtual object and the second private virtual object are displayed by the HMD.

21. The non-transitory computer-readable storage medium of claim 20, wherein the private virtual object indicates a portion of the public content that the second user is viewing.

* * * * *